US007246570B2

(12) United States Patent
Weng et al.

(10) Patent No.: US 7,246,570 B2
(45) Date of Patent: Jul. 24, 2007

(54) INDICATION FILM FOR TEMPERATURE AND TEMPERATURE DISTRIBUTION MEASUREMENT AND RELATED METHOD

(75) Inventors: Dacong Weng, Rancho Palos Verdes, CA (US); Rong Fan, Rancho Palos Verdes, CA (US); Xiwang Qi, Torrance, CA (US); Shekhar Shripad Kamat, Redondo Beach, CA (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 11/048,851

(22) Filed: Feb. 3, 2005

(65) Prior Publication Data

US 2006/0169953 A1   Aug. 3, 2006

(51) Int. Cl.
*G01K 11/14* (2006.01)
(52) U.S. Cl. ...................................... 116/216
(58) Field of Classification Search ............... 116/206, 116/207, 216, 217; 374/106, 161, 162
See application file for complete search history.

(56) References Cited

U.S. PATENT DOCUMENTS

| | | | | |
|---|---|---|---|---|
| 3,664,884 A | * | 5/1972 | Underwood | 148/242 |
| 3,888,631 A | * | 6/1975 | Sturzinger | 422/56 |
| 4,425,161 A | * | 1/1984 | Shibahashi et al. | 106/31.17 |
| 4,589,562 A | * | 5/1986 | Fawley | 220/590 |
| 5,756,356 A | * | 5/1998 | Yanagi et al. | 436/7 |
| 6,145,468 A | * | 11/2000 | Woog | 116/206 |
| 6,444,313 B1 | * | 9/2002 | Ono et al. | 428/372 |
| 2002/0090510 A1 | * | 7/2002 | Ono et al. | 428/375 |
| 2003/0112140 A1 | * | 6/2003 | Everson et al. | 340/521 |
| 2007/0048438 A1 | * | 3/2007 | Parkin et al. | 427/96.8 |

FOREIGN PATENT DOCUMENTS

| | | | |
|---|---|---|---|
| DE | 3324241 A | * | 1/1985 |
| JP | 03227237 A | * | 10/1991 |
| JP | 04254726 | | 9/1992 |
| JP | 06313738 A | * | 11/1994 |
| JP | 09250954 | | 9/1997 |
| JP | 11125566 | | 5/1999 |
| JP | 11153496 | | 6/1999 |
| JP | 2001040599 | | 2/2001 |

* cited by examiner

*Primary Examiner*—R. Alexander Smith
(74) *Attorney, Agent, or Firm*—Nixon & Vanderhye, PC

(57) ABSTRACT

A method of determining temperature and temperature distribution over the surface of an object includes (a) applying a temperature sensitive film composed of material displaying change in color as a function of temperature on a surface of an object; and (b) comparing the color changes on the film with predetermined color and temperature data developed for the film. A related temperature indication device includes a temperature indication device for measuring the temperature and temperature distribution over a surface of an object comprising: a thin film composed of a plurality of fibers embedded in an inert binder wherein the plurality of metal or metal alloy fibers have a property whereby the fibers exhibit color change as a function of temperature, when the thin film is engaged with the surface of the object.

11 Claims, 1 Drawing Sheet

INDICATION FILM FOR TEMPERATURE AND TEMPERATURE DISTRIBUTION MEASUREMENT AND RELATED METHOD

BACKGROUND OF THE INVENTION

This invention relates to the measurement of temperature and temperature distribution on the surface of any object, including a planar fuel cell stack.

Thermocouples and resistance temperature detectors (RTDs) are usually used in the measurement of temperature and temperature distribution of a surface of an object. For example, JP 11153496 and JP 11125566 disclose methods that include embedding/adhering a plurality of heat sensors, for example, the tips of thermocouples, on the measuring surface to non-destructively measure the temperature and temperature distribution of the surface of the object. These methods typically involve relatively complex measuring apparatus that require bonding materials having high thermal conductivity thus increasing both the complexity and failure probability of the measurement.

JP 04254726 describes a device that uses a plurality of single core optical fibers to measure the temperature distribution of the surface of an object by receiving heat radiation light from the object. This method can be used to measure objects with complicated or curved surfaces. These measurement systems are complex and require tight clearances between the measured surface and the optical fibers.

JP 2001040599 discloses a temperature-indicating Shoji paper that comprises temperature-sensitive pigments that are different in color at different temperatures to measure and indicate the room temperature.

JP 09250954 discloses a thin film that contains organic electric field emission elements. The temperature and temperature distribution of the surface of an object can be detected by the emission intensity. However, the measurement range of this method is limited based on the decomposing temperature of the organic electric field emission elements.

Since the above prior art techniques are not satisfactory in many respects, there remains an urgent need to identify a simple, easy and quick way to measure the temperature and temperature distribution of a surface of an object within a wide temperature range.

BRIEF DESCRIPTION OF THE INVENTION

In accordance with an exemplary embodiment of this invention, indication films are composed that provide an efficient tool for the direct measurement of temperature and temperature distribution over the surface of an object. In an exemplary embodiment, the indication film may include metal, metal alloy or polymer fibers that change color as the fibers are oxidized or decomposed at a certain temperature in an air (oxygen) containing environment. The metal, metal alloy or polymer fibers are held together by bonding material in an inert matrix so as to form the indication film. The bonding material also provides thermal insulation so that the metal, metal alloy or polymer fibers can only sense the surface temperatures of the measured articles.

Since the intensity of color change of the metal, metal alloy or polymer fibers is directly related to the temperature and time that the fibers are exposed, it is possible to quantify the color change and thereby reveal actual temperature at any point of the surface contacted by the temperature indication film. The change in color over the surface of the film may be easily translated to temperature distribution by comparison to color calibration tables based on different fiber and bonding materials as a function of temperature.

The temperature indication fibers in the temperature indication film may be made of any suitable metal, metal alloy or polymer fibers, such as aluminum fiber, nickel fiber, stainless steel fiber, polyester and polyamide fibers. The bonding material (or binder) on the other hand may be made of any suitable temperature-resistant material depending on the range of measurement, such as epoxy, glass, or glass ceramic.

Accordingly, in one aspect, the present invention relates to a temperature indication device for measuring the temperature and temperature distribution over a surface of an object comprising a thin film composed of a plurality of fibers embedded in an inert binder wherein the plurality of fibers exhibit color change as a function of temperature, when the thin film is engaged with the surface of the object.

In another aspect, the present invention relates to a temperature indication device for measuring the temperature and temperature distribution over a surface of an object comprising a thin film composed of a plurality of fibers embedded in an inert binder wherein the plurality of fibers exhibit color change as a function of temperature, when the thin film is engaged with the surface of the object; wherein the fibers are selected from the group consisting of metal, metal alloy or polymer fibers, such as, aluminum fibers, nickel fibers, stainless steel fibers, polyester fibers and polyamide fibers; wherein the binder is comprised of epoxy, glass or ceramic material; and further comprising a chart illustrating color variations of different fiber and binder materials as a function of temperature of such materials.

In still another aspect, the present invention relates to a method of determining temperature and temperature distribution over the surface of an object comprising (a) applying a temperature sensitive film composed of material displaying change in color as a function of temperature on a surface of an object; and (b) comparing the color changes on the film with predetermined color and temperature data developed for the film.

DETAILED DESCRIPTION OF THE INVENTION

Figure 1:
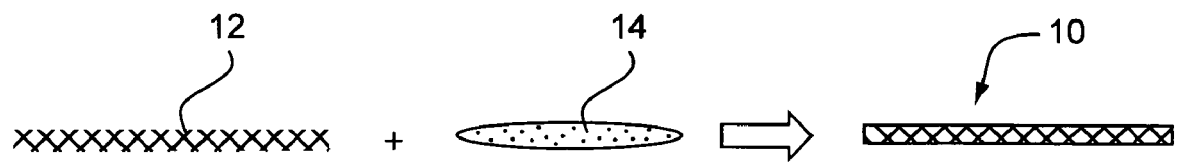
FIG. 1 is a schematic diagram of a combination of fibers and bonding material to form a temperature indication film in accordance with an exemplary embodiment of the invention.

FIG. 1 illustrates in schematic form a temperature indication film 10 composed of metal, metal alloy or polymer fibers 12 and inert bonding material 14. The bonding materials hold the metal, metal alloy or polymer fibers together to form the film 10 and to provide thermal insulation for the fibers such that the fibers can sense only the temperature of the article(s) of interest, thereby increasing measurement accuracy, especially for measurement of distribution of temperature over the surface of an object.

The metal, metal alloy or polymer fibers 12 selected for inclusion in the film change color as the fibers are oxidized at certain temperatures in oxygen containing environments. Suitable fibers include metal, metal alloy or polymer fibers, such as aluminum fibers, nickel fibers, stainless steel fibers, polyester fibers, and polyamide fibers. The bonding material may be made of any kind of temperature resistant materials depending on the range of measurement, such as epoxy, glass, or glass-ceramic.

Since the intensity of color change of the metal, metal alloy or polymer fiber material is directly related to the temperature and time of exposure, the color changes may be quantified and thus reveal the actual temperature at any point on the surface of the object contacted by the temperature indication film. The distribution color change of the indication film could be easily translated to temperature distribution by comparing to a color calibration tables that are based on different fiber and bonding materials as a function of temperature.

Figure 2:
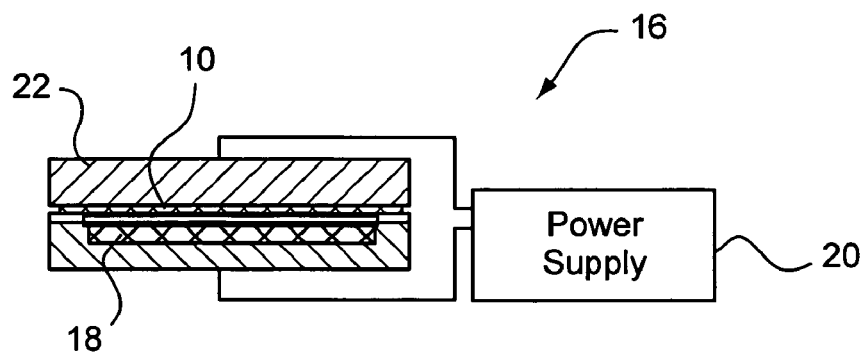
FIG. 2 is a schematic diagram of an experimental setup for testing a temperature indication film on the surface of a fuel cell interconnect.
Figure 3:
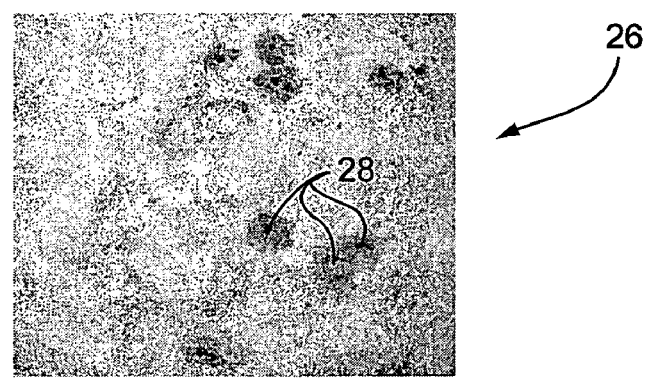
FIG. 3 is a photomicrograph showing the variation in color over the surface of the metal wool pad 10 in FIG. 2 due to metal oxidation caused by local high temperature on the surface of the fuel cell interconnect.

FIG. 2 shows in schematic form an experimental setup 16 where the temperature indication film 10 is in the form of a metal wool (e.g., steel wool) pad used to confirm the presence of one or more electric shorts on the surface (i.e., target surface) of a fuel cell interconnect 18. After passing current through the cell at room temperature via power supply 20 and current collector 22, the heat generated from the cell short spot causes the oxidation of the metal wool pad. FIG. 3 shows the color change of the metal wool pad caused by the metal alloy oxidation due to local oxidized spots 28 generated by electrical shorts on the surface of interconnect 18. It may be beneficial to lightly press the film against the target surface to insure uniform contact and thus more accurate readings. Alternatively, the thin flexible film may be adhered to the target surface via any suitable adhesive that does not interfere with the temperature readings.

As described above, temperature indication film composed in accordance with the invention enable:

quick and easy measurement of surface temperature and temperature distribution on the surface of an object;

temperature measurement not limited by the surface topography of the object, i.e., the surface may be flat, curved, irregular, etc.;

quantification of temperature and temperature distribution via color change in the indication film;

increased simplicity and reliability of the measurements; and reduction in cost of the measurements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A temperature indication device for measuring the temperature and temperature distribution over a surface of an object comprising:

a thin film composed of a plurality of metal or metal alloy fibers embedded in an inert binder wherein said plurality of metal or metal alloy fibers have a property whereby said fibers exhibit color change as a function of temperature, when the thin film is engaged with the surface of the object.

2. The temperature indication device of claim 1 wherein said metal or metal alloy fibers comprise aluminum fibers, nickel fibers or stainless steel fibers.

3. The temperature indication device of claim 2 wherein said binder is comprised of epoxy, glass or ceramic material.

4. The temperature indication device of claim 1 wherein said binder is comprised of epoxy, glass or ceramic material.

5. The temperature indication device of claim 1 and further comprising a chart illustrating color variations of different fibers and binder materials as a function of temperature.

6. A temperature indication device for measuring the temperature and temperature distribution over a surface of an object comprising:

a thin film composed of a plurality of fibers embedded in an inert binder wherein said plurality of fibers exhibit color change as a function of temperature, when the thin film is engaged with the surface of the object; wherein said fibers are selected from the group consisting of metal and metal alloys; wherein said binder is comprised of epoxy, glass or ceramic material; and further comprising a chart illustrating color variations of different fiber and binder materials as a function of temperature of such materials.

7. The temperature indicating device of claim 6 wherein said metal or metal alloy fibers comprise aluminum fibers, nickel fibers or stainless steel fibers.

8. A method of determining temperature and temperature distribution over the surface of an object comprising:

(a) applying a temperature sensitive film composed of material displaying change in color as a function of temperature on a surface of an object, wherein said material comprises fibers selected from the group consisting of metal and metal alloy fibers, embedded in an inert matrix; and (b) comparing the color changes on the film with predetermined color and temperature data developed for said film.

9. The method of claim 8 wherein said inert matrix comprises a binder comprised of epoxy, glass or ceramic material.

10. The method of claim 8 wherein said object comprises a fuel cell stack.

11. The method of claim 8 wherein said metal or metal alloy fibers comprise aluminum fibers, nickel fibers or stainless steel fibers.

* * * * *

UNITED STATES PATENT AND TRADEMARK OFFICE
CERTIFICATE OF CORRECTION

PATENT NO.          : 7,246,570 B2
APPLICATION NO. : 11/048851
DATED                 : July 24, 2007
INVENTOR(S)        : Weng et al.

It is certified that error appears in the above-identified patent and that said Letters Patent is hereby corrected as shown below:

In Column 1, Ln. 4, Insert:

--This invention was made with U. S. Government support under contract DE-FC26-01NT41245 awarded by the Department of Energy. The Government has certain rights in this invention.--

Signed and Sealed this

Nineteenth Day of August, 2008

JON W. DUDAS
*Director of the United States Patent and Trademark Office*